(No Model.)
D. B. TAYLOR.
APPARATUS FOR ELEVATING AND MOVING GRAIN.
No. 475,635. Patented May 24, 1892.
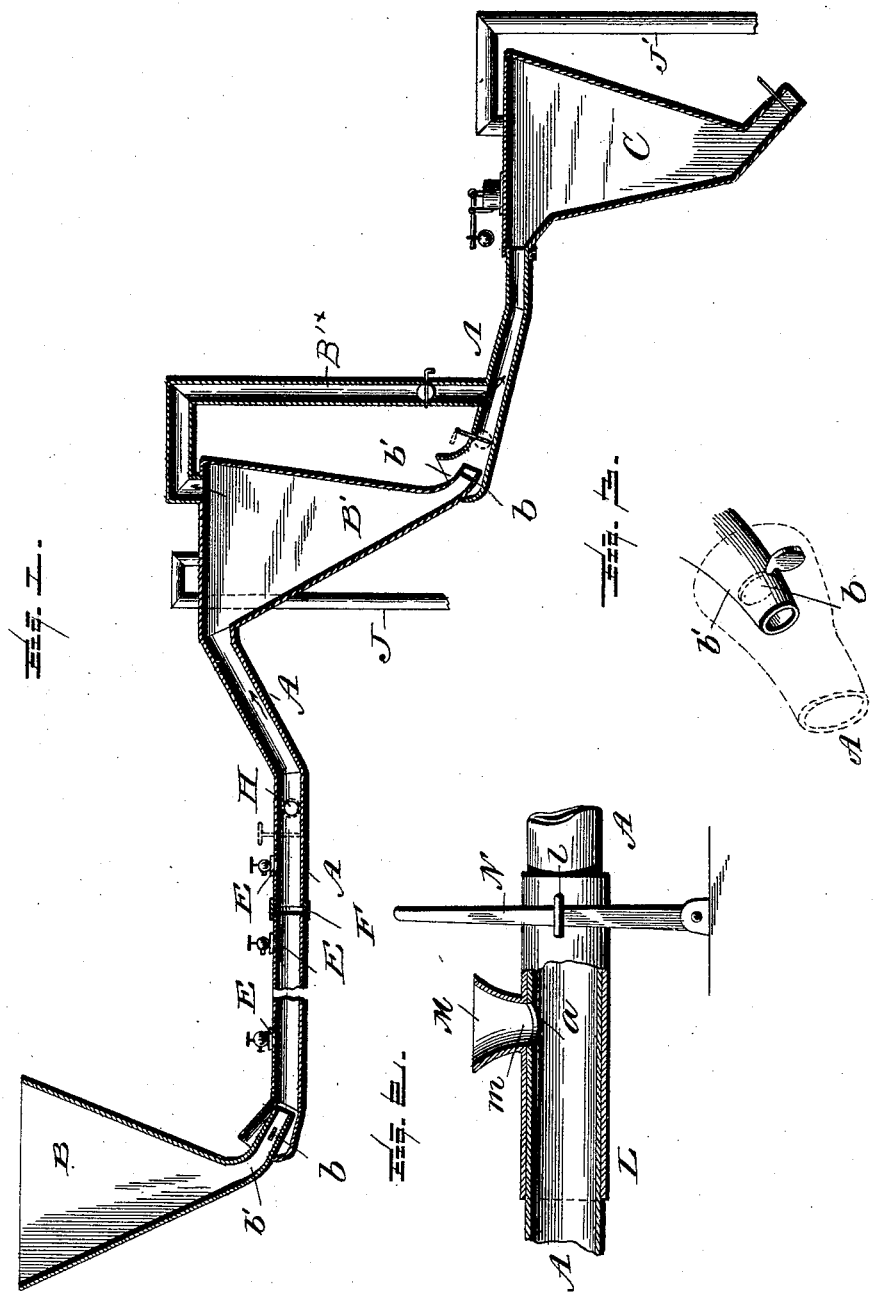
Witnesses
L. C. Hill
A. L. Hough.
Inventor:
Daniel B. Taylor;
by Franklin H. Hough
Attorney

UNITED STATES PATENT OFFICE.

DANIEL B. TAYLOR, OF ST. LOUIS, MISSOURI.

APPARATUS FOR ELEVATING AND MOVING GRAIN.

SPECIFICATION forming part of Letters Patent No. 475,635, dated May 24, 1892.

Application filed December 4, 1891. Serial No. 414,017. (No model.)

*To all whom it may concern:*

Be it known that I, DANIEL B. TAYLOR, a citizen of the United States, residing at St. Louis, in the State of Missouri, have invented certain new and useful Improvements in Apparatus for Elevating and Moving Grain; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in devices for moving grain and other like materials of that class, wherein a current of air is employed for a means of moving or elevating the grain or other material; and it has for its objects, among others, to provide an improved, simple, and cheap apparatus of this class and an improved process for conveying the material.

The objects and advantages of the invention will hereinafter appear, and the novel features thereof will be specifically defined by the appended claim.

The novelty in the present instance resides in the novel steps of the process, as well as in the peculiar combinations, arrangement, and adaptation of parts, all as more fully hereinafter described, shown in the drawings, and then particularly pointed out in the claim.

The invention is clearly illustrated in the accompanying drawings, which, with the letters of reference marked thereon, form a part of this specification, and in which—

Figure 1 is a vertical central section through my improved apparatus. Fig. 2 is a view on an enlarged scale, showing means for introducing the grain into the conveyer-tube at any point of its length. Fig. 3 is a detail of the inlet-passage and valve.

Like letters of reference indicate like parts in all the views where they occur.

Some of the parts employed in my improved apparatus are or may be of any of the well-known forms, and hence they have not been shown in detail nor will they be so described, it being understood that where not specifically described any well-known form of construction may be used, as may be desired. For instance, the air-pump employed needs no special construction or changes to adapt it to my use.

Referring to the details of the drawings by letter, A designates the conveyer-tube, extending between the points B and C.

B is the receiving hopper or bin, containing the grain or other material which is to be conveyed through the tube to the discharge receptacle or chamber C.

The bin B has an opening in its bottom, which is designed to be closed by a suitable valve $b$ and this opening is of less area than that of the tube through which the material is to be conveyed and into which it communicates. The bin preferably has an elongated neck $b'$, extending within the tube, as shown in Fig. 1. I form this opening smaller than the tube, so that the amount of material passing therethrough into the tube at no time fills the tube, so that there is sufficient space for the passage of the air along with the grain or other material. In order to force the material through the tube, I exhaust the air from the receptacle C, thereby causing the air to rush through the tube A, carrying with it the grain or other material and depositing it in the receptacle C, and as the air is exhausted in front of or in advance of the grain or other material, there being no resistance to cause friction, the grain or other material will not be injured in its passage from the one place to the other.

In the transportation of grain or seeds that would not feed readily I propose to use a wind-wheel at the opening in the neck of the bin B, with a screw extending into the bin and into the bulk of the grain, and the force of the air passing into the pipe will revolve the screw and force the grain or seeds out and into the tube A. It is, in fact, a screw force-feed.

At intervals along the tube A, I arrange openings E, closed by valves, which are to be used in case of stoppage in the tube. By opening them to allow the air to escape it can be readily determined between which two of said openings the stoppage occurs.

F designates a joint in the conveyer-tube, where the same may be opened to receive grain or other material. This may be arranged at any suitable point in the tube. A similar opening H may be provided for the purpose of examining the tube at any time or for admitting grain or other material.

J designates the attachments of the air-pumps for exhausting the air from the receptacle.

In the arrangement of parts for conveying the material over hills or other elevations or obstructions, where extra power is necessary and where extra pumps may be used, so that the power can all be concentrated at any given point to overcome an elevation, I employ the auxiliary receiver B', with its attachment J to a pump, and an auxiliary tube B'ˣ, having tight connections with the auxiliary receiver and with the conveyer-tube and provided with a valve, as seen in Fig. 1.

In Fig. 2 of the drawings I have shown a means whereby grain may be introduced into the conveyer-tube at any desired point of its length. An aperture $a$ is provided in the tube at the point at which it is proposed to admit the grain. A sleeve L is placed upon the pipe at this point, said sleeve being provided with an opening $m$, corresponding in size with the opening in the pipe A, and with a hopper M for the admission of the grain. The said sleeve L is adapted to be readily moved upon the pipe A, so as to cause the opening in the sleeve to register with the opening in the pipe or to close said opening, as may be desired.

What I claim as new is—

A conveying apparatus comprising a receiving-hopper having an elongated neck provided with a valve, a discharge-receptacle, means for exhausting the air therefrom, an auxiliary receptacle, a conveying-tube between the hopper and the auxiliary receptacle and provided with an enlarged mouth surrounding the elongated neck of said hopper, an air-pump attachment J, having tight connection with the auxiliary receptacle, a second conveying-tube between the said receptacle and the discharge-receptacle and having an enlarged space around the outlet of the auxiliary receptacle, and a tube B'ˣ, provided with a valve and connecting the auxiliary receptacle with the second conveyer-tube, substantially as shown and described.

In testimony whereof I affix my signature in presence of two witnesses.

DANIEL B. TAYLOR.

Witnesses:
GERALDINE TWITT,
JULIUS C. PAULUS.